Patented June 22, 1937

2,084,311

UNITED STATES PATENT OFFICE 2,084,311

ARYL MERCURIC SALTS OF BENZENE CARBOXYLIC ACIDS

Carl N. Andersen, Watertown, Mass., assignor to Lever Brothers Company, a corporation of Maine No Drawing. Application October 18, 1933, Serial No. 694,205

9 Claims. (Cl. 260—13)

The present invention relates to new organic mercury compounds, particularly aryl mercuric salts of benzene carboxylic acids.

It is an object of the invention to produce new organic mercury compounds useful as germicides and for other therapeutic purposes.

I have discovered that when the carboxyl hydrogen atoms of carboxylic acids of benzene and its homologues are substituted by basic radicals of phenylmercury compounds, or certain similar aromatic mercury compounds, compounds are produced having high potency as antiseptics and germicides and at the same time are characterized by relatively low toxicity and other desirable properties. My investigations leading to the production of phenylmercury salts of benzoic acid and of polybasic aromatic acids such as phthalic acid, trimesic acid, pyromellitic acid, mellitic acid and benzenepentacarboxylic acid, have shown that these salts possess extraordinarily high potency as germicides. It has furthermore been observed that the greater the number of carboxy groups of the acid used, and hence the greater number of phenylmercury radicals that may be substituted, the greater is the germicidal potency of the resulting salt. This and other observations made by me have confirmed my belief that the aromatic mercury salts of the carboxylic acids of the polynuclear aromatic hydrocarbons, e. g., naphthalene, anthracene and phenylanthracene are likewise characterized by highly satisfactory germicidal properties and such compounds are included within the scope of my invention.

The compounds constituting the subject matter of the present invention may be described as having the general formula $(RHg)_x.R_1$, in which R represents an aromatic structure, which may be an aromatic nucleus with or without side chains, and in which none of the nuclear or side chain carbons has direct linkage with any element other than hydrogen, carbon and mercury; in which $x$ is an integer having a value of 1 or more; and in which $R_1$ represents an aromatic hydrocarbon acid radical which may have one or more COOH groups that is linked to a RHg group or groups through replacement of a carboxyl hydrogen atom or atoms. R may stand for the phenyl group, $C_6H_5$, or for an aromatic hydrocarbon having a nucleus similar to the phenyl hydrocarbons, as for example, polycyclic hydrocarbons in which all the nuclear carbons other than the one attached to mercury, and any side chain carbons, have their valences satisfied by carbon or hydrogen. Examples are the paradiphenyl

and naphthyl

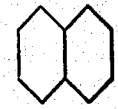

groups. The expression "aromatic structure" as used herein is intended to be generic and include an aromatic nucleus with or without side chains.

While the word group is used hereinafter, it will be understood that it must be interpreted as plural when the value of $x$ is more than one.

The compounds may be prepared in various ways. The following specific examples illustrate the invention:

Example 1

2.94 grams of phenylmercury hydroxide were dissolved in 1 liter of water by heating to boiling. The solution was then filtered to remove any gums or other insoluble material present. To the filtrate was added an aqueous solution containing 1.34 grams of benzoic acid. The resulting mixture was then heated to boiling and then allowed to cool and stand until precipitation was complete. The precipitate after filtration was washed thoroughly with water and dried. The resulting product is a white crystalline product which is sparingly soluble in water. It melts at 94° C. and conforms to the formula $C_6H_5HgOOC.C_6H_5$ for phenylmercury benzoate.

Example 2

17.64 grams of phenylmercury hydroxide were dissolved in 4 liters of water. The mixture was filtered and to the filtrate was added 4.87 grams of phthalic anhydride in aqueous solution. The mixture was brought to boiling and then allowed to cool and stand until precipitation was complete. The precipitate was then washed with distilled water and dried. The resulting product is a white crystalline substance sparingly soluble in water and melting at 217°. It conforms to the formula $C_6H_4.(COOHgC_6H_5)_2$ for phenylmercury phthalate.

Example 3

17.64 grams of phenylmercury hydroxide were dissolved in 4 liters of water and then filtered. To the filtered solution was added an aqueous solution of 4.62 grams of trimesic acid. The solution was brought to boiling and then allowed to stand for 24 hours. The precipitate was then filtered off, washed and dried. The resulting product is a white crystalline substance melting above 250° C. It conforms to the formula $$C_6H_3.(CO.OHgC_6H_5)_3$$

for phenylmercury trimesate.

Example 4

14.7 grams of phenylmercury hydroxide were dissolved in 4 liters of water by heating to boiling. The solution was filtered and to the filtrate was added an aqueous solution of 4.46 grams of benzene-pentacarboxylic acid. The resulting mixture was heated to boiling and then cooled and allowed to stand for 24 hours before filtering. The precipitate after filtration was washed thoroughly with water and dried. The resulting product is a white crystalline product which is sparingly soluble in water. It conforms to the formula $C_6H.(CO.OHgC_6H_5)_5$ for phenylmercury benzenepentacarboxylate.

In all cases the yields obtained were substantially theoretical. The 10% excess of acid was added to insure the complete conversion of the phenylmercury hydroxide. Owing to the relatively high solubility of the acids as compared with the salts formed, no difficulty is encountered in washing the salt precipitate free from the excess acid.

In the examples, the method employed is the general neutralization method of reacting a base with an acid to produce a salt and water. The application of this method to the preparation of phenylmercury salts of organic acids is being claimed in my co-pending application Serial No. 694,198, filed October 18, 1933. This method has the advantage that the only by-product of the reaction is water.

Another method that may be employed in preparing these salts is the so-called precipitation method wherein a phenylmercury salt of an organic acid, e. g., phenylmercury acetate, is reacted with an acid capable of forming phenylmercury salts of relatively low solubility as compared with the salts of the first acid and that are also relatively insoluble as compared with the first acid itself. This general method as applied to the preparation of phenylmercury salts of organic acids generally is described and claimed in my co-pending application Serial No. 694,199, filed October 18, 1933.

All of the compounds produced as above described are characterized by highly satisfactory antiseptic and germicidal properties. Tests to determine the efficacy of the phthalate and the benzenepentacarboxylate in killing *B. typhosus* and *Staph. aureus* were carried on under the following conditions:

Aqueous solutions of varying dilutions from 1:10,000 upward until killing ceased were made up. These dilutions were employed in the conduct of the tests by the following methods: Circular 198, U. S. Dept. of Agriculture, Dec. 1931, described as F. D. A. method against *Eberthella typhi* (typhoid bacillus) at 37° C. and F. D. A. special method against *Staph. aureus* at 37° C.

The maximum dilutions at which killing in 15 minutes resulted are given below:

|  | B. typhosus | Staph. aureus |
|---|---|---|
| Phenylmercury phthalate | 1:120,000 | 1:40,000 |
| Phenylmercury benzenepentacarboxylate | 1:134,000 | 1:70,000 |

Tests so far conducted with the other compounds above mentioned indicate that, with the exception of the benzoate, they possess germicidal properties that are intermediate in degree to those of the phthalate of the benzenepentacarboxylate. The potency of the benzoate is somewhat below that of the phthalate but is nevertheless high as compared to most germicides heretofore available. All of these compounds are characterized by relatively low toxicity. Because of this and their high potency which makes it possible to use them in extreme dilutions they may be used locally in most cases and in some cases administered internally with satisfactory results from the germicidal standpoint and without harmful effects.

These new compounds may be used directly as germicides in aqueous or other solutions or may be formed into various preparations such as mouth washes, tooth pastes, soaps, etc. and such compositions are considered to be within the scope of the invention as defined in the appended claims.

I claim:

1. A new organic mercury compound of the general formula $(RHg)_x.R_1$, in which R represents an aromatic structure, and in which none of the carbon atoms has direct linkage with any element other than hydrogen, carbon and mercury; in which $R_1$ represents the radical of an acid selected from the group consisting of the carboxylic acids of benzene and its homologues, which radical is linked to the RHg group through replacement of the carboxyl hydrogen; and in which $x$ is an integer having a value of at least 1 and not more than the number of carboxyl hydrogens in the acid.

2. A new organic mercury compound of the general formula $(RHg)_x.R_1$, in which R represents an aromatic structure, and in which none of the carbon atoms has direct linkage with any element other than hydrogen, carbon and mercury; in which $R_1$ represents the acid radical of an unsubstituted carboxylic acid of benzene that is linked to the RHg group through replacement of the carboxyl hydrogen; and in which $x$ is an integer having a value of at least 1 and not more than the number of carboxyl hydrogens in the acid.

3. A new organic mercury compound of the general formula $(RHg)_x.R_1$, in which R represents an aromatic nucleus, and in which none of the carbon atoms has direct linkage with any element other than hydrogen, carbon and mercury; in which $R_1$ represents the acid radical of an unsubstituted polybasic carboxylic acid of benzene that is linked to the RHg group through replacement of the carboxyl hydrogen; and in which $x$ is an integer having a value of at least 1 and not more than the number of carboxyl hydrogens in the acid.

4. A phenylmercury salt of an acid selected from the group consisting of the carboxylic acids of benzene and its homologues.

5. A phenylmercury salt of an unsubstituted polybasic carboxylic acid of benzene.

6. A phenylmercury salt of an unsubstituted carboxylic acid of benzene.

7. Phenylmercury phthalate.

8. Phenylmercury trimesate.

9. Phenylmercury benzenepentacarboxylate.

CARL N. ANDERSEN.